(12) United States Patent
Barghouthi et al.

(10) Patent No.: US 10,833,958 B2
(45) Date of Patent: *Nov. 10, 2020

(54) SERVICE LEVEL AGREEMENT (SLA) COGNIZENT SELF-MANAGING DATABASE CONNECTION POOLS IN A MULTI-TENANT ENVIRONMENT

(71) Applicant: International Business Machines Corporation, Armonk, NY (US)

(72) Inventors: Soloman J. Barghouthi, Morrisville, NC (US); Dana L. Price, Cary, NC (US); Stephen Kenna, Cary, NC (US); Charles LeVay, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 789 days.

This patent is subject to a terminal disclaimer.

(21) Appl. No.: 14/476,696

(22) Filed: Sep. 3, 2014

(65) Prior Publication Data

US 2016/0065418 A1 Mar. 3, 2016

(51) Int. Cl.
*H04L 12/24* (2006.01)
*H04L 29/08* (2006.01)
(Continued)

(52) U.S. Cl.
CPC ...... *H04L 41/5003* (2013.01); *H04L 41/5022* (2013.01); *H04L 47/765* (2013.01);
(Continued)

(58) Field of Classification Search
CPC ............. H04L 41/5003; H04L 41/5022; H04L 47/765; H04L 67/10; H04L 47/2425
See application file for complete search history.

(56) References Cited

U.S. PATENT DOCUMENTS

| | | | | |
|---|---|---|---|---|
| 7,337,226 | B2* | 2/2008 | Saha | G06F 17/30457 709/223 |
| 8,145,759 | B2* | 3/2012 | Bhogi | G06F 9/5061 709/226 |

(Continued)

FOREIGN PATENT DOCUMENTS

CN 101777047 7/2010

*Primary Examiner* — Kristopher Andersen
(74) *Attorney, Agent, or Firm* — Alex Harvey

(57) ABSTRACT

Embodiments of the invention provide a method, system and computer program product for SLA cognizant database connection management for multi-tenant environments. In an embodiment of the invention, a method for SLA cognizant database connection management for multi-tenant environments includes receiving different requests for data in a database from different application instances executing in memory of a host computing system supporting a multi-tenant computing environment and determining a priority for each of the requests. The method also includes selecting for each request a particular portion of a database connection pool of a multiplicity of database connections to the database, in that the particular portion is associated with a corresponding priority of the request, and each portion of the database connection pool includes one or more of the database connections. Finally, the method includes processing each of the requests through a respectively selected one of the portions of the database connection pool.

8 Claims, 1 Drawing Sheet

(51) Int. Cl.
*H04L 12/919* (2013.01)
*H04L 12/851* (2013.01)

(52) U.S. Cl.
CPC ............ *H04L 67/10* (2013.01); *H04L 67/125* (2013.01); *H04L 67/322* (2013.01); *H04L 47/2425* (2013.01)

(56) References Cited

U.S. PATENT DOCUMENTS 8,468,251 B1 6/2013 Pijewski et al.
2015/0127611 A1* 5/2015 Westerman ......... H04L 41/5003
707/639

* cited by examiner

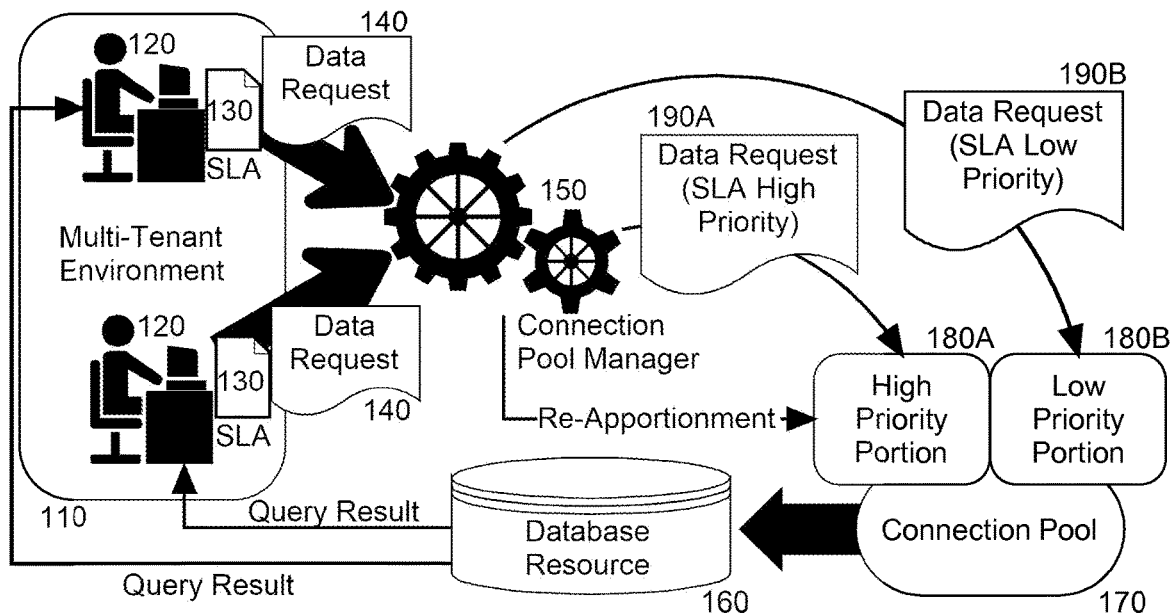
FIG. 1
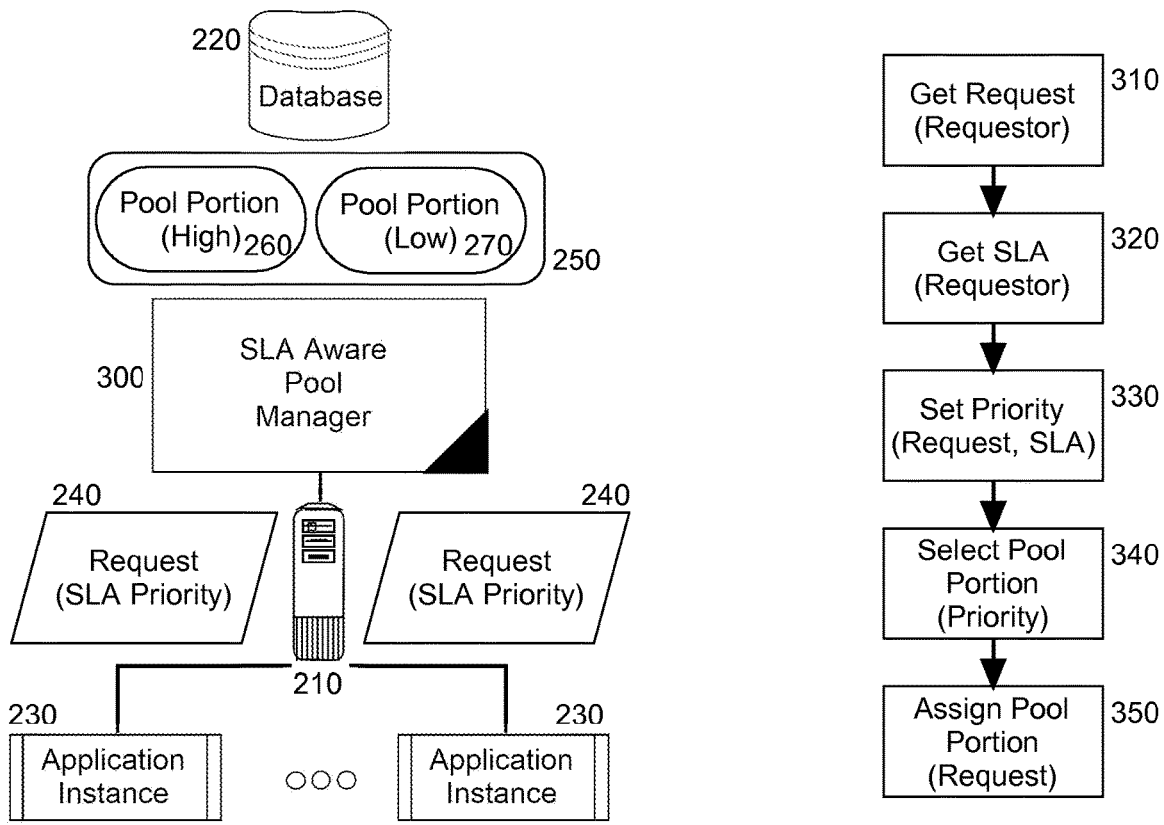
FIG. 2
FIG. 3

SERVICE LEVEL AGREEMENT (SLA) COGNIZENT SELF-MANAGING DATABASE CONNECTION POOLS IN A MULTI-TENANT ENVIRONMENT

BACKGROUND OF THE INVENTION

Field of the Invention

The present invention relates to database connection management and more particularly to service level agreement (SLA) cognizant database connection management for multi-tenant environments.

Description of the Related Art

Multi-tenancy refers to a computing architecture in which a single instance of a software application serves multiple customers (tenants) as if each customer enjoyed its own deployment of the software application. Indeed, to promote the façade of uniqueness, each tenant is often provided the opportunity to customize portions of the software application—particularly the user interface. Consequently, the theory and practice of multi-tenancy allows the cost of development, deployment and maintenance of an application to be shared across all tenants so as to provide a substantially lower cost of ownership to each tenant. Indeed, in a multi-tenancy architecture, the host only apply software application updates once. In contrast, in a single-tenancy architecture, the host must apply the application update repeatedly to each end user.

Part and parcel of the multi-tenancy architecture is the providing of access to database management without requiring each tenant to deploy and maintain a separate database management system. Like any other computing resource, however, access to a shared database management system in a multi-tenancy environment can be limited and therefore, requires management so as to ensure availability to all tenants. However, some tenants are treated more fairly than others depending upon the unique terms and conditions of a corresponding SLA for each tenant. To the extent that some tenants are contractually guaranteed greater access to database management functionality than others, access to a database management system in a multi-tenancy environment must be biased towards different tenants dependent upon the terms of the SLAs involved.

Of note, managing access to database management accounts for the contemporaneously measured performance of a network and the host system so as to route lower priority traffic during times of low utilization so as to not overburden resources during periods of congestion and high resource utilization. To wit, sophisticated SLA methods take into account health statistics, such that both high and low priority requests are routed to the "healthiest" server. Yet, if the majority of connections to a database on a selected "healthy" server are allocated to low priority requests, or if there are a mix of high and low priority requests in a queue waiting for database connections, the high priority requests do not receive the desired level of service and may have to wait behind lower priority requests. This undesirable result can be compounded by a computing environment in which the database is the bottleneck for reasons such as long running database requests.

In light of the complexities of managing database access in a multi-tenancy environment, applications written for multi-tenancy are custom coded to utilize multiple different data sources for the different tenants so as to create distinct connection pools for the different tenants in furtherance of corresponding SLAs. Obviously, custom coding an application to accommodate different SLAs for different tenants can be prohibitive for even a modest number of tenants. In addition, though the intent of creating multiple data sources so is to expand a number of total available database connections, in doing so, a conflict can arise with the defined size of the connection pools established not by the application developer, but by the database administrator.

BRIEF SUMMARY OF THE INVENTION

Embodiments of the present invention address deficiencies of the art in respect to database connection management for multi-tenant environments and provide a novel and non-obvious method, system and computer program product for SLA cognizant database connection management for multi-tenant environments. In an embodiment of the invention, a method for SLA cognizant database connection management for multi-tenant environments includes receiving different requests for data in a database from different application instances executing in memory of a host computing system supporting a multi-tenant computing environment and determining a priority for each of the requests. The method also includes selecting for each request a particular portion of a database connection pool of a multiplicity of database connections to the database, in that the particular portion is associated with a corresponding priority of the request, and each portion of the database connection pool includes one or more of the database connections. Finally, the method includes processing each of the requests through one of the selected portions of the database connection pool.

In one aspect of the embodiment, the priority of each request by a corresponding one of the application instances is determined by an SLA associated with the corresponding one of the application instances. In another aspect of the embodiment, the priority of each request is embedded within the request. In yet another aspect of the embodiment, the portions of the pool are dynamically re-apportioned to include different ones of the database connections according to an anticipated load of requests of a particular priority. Finally, in even yet another aspect of the embodiment, the pool includes a buffer of a multiplicity of database connections not included amongst the portions, and, as such, the re-apportionment of the portions utilizes database connections within the buffer.

In another embodiment of the invention, a multi-tenancy data processing system is configured for SLA cognizant database connection management. The system includes a host computing system that includes at least one computer with memory and at least one processor, and provides a multi-tenancy computing environment in which different application instances of a computing application execute in the memory of the host computing system. The system also includes a database communicatively coupled to the host computing system and a connection pool of database connections to the database. In this regard, the connection pool includes different portions, each including a selected set of the database connections.

Finally, the system includes an SLA aware pool management module executing in the memory of the host computing system. The module includes program code enabled upon execution to receive different requests for data in the database from different ones of the application instances, to determine a priority for each of the requests, to select for each request a particular one of the portions of the database connection pool associated with a corresponding priority of the request, and to process each of the requests through a respectively selected one of the portions of the database connection pool.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for SLA cognizant database connection management for multi-tenant environments;

FIG. 2 is a schematic illustration of a multi-tenancy data processing system configured for SLA cognizant database connection management; and, FIG. 3 is a flow chart illustrating a process for SLA cognizant database connection management for multi-tenant environments.

DETAILED DESCRIPTION OF THE INVENTION

Embodiments of the invention provide for SLA cognizant database connection management for multi-tenant environments. In accordance with an embodiment of the invention, a connection pool to a database resource can be established in a multi-tenancy computing environment, with different portions of the connection pool corresponding to different priorities for different access requests to the database resource. For instance, one portion of the connection pool can be allocated to higher priority requests, while another portion of the connection pool being allocated to lower priority requests. Thereafter, requests to access the database resource can be received from different tenants of the multi-tenancy computing environment. Each request can be assigned a priority based upon an SLA of a corresponding tenant issuing the request. As such, upon receipt of a request, the associated priority can be determined and a requisite portion of the connection pool selected to best accommodate the priority of the request. Optionally, the portions allocated to the different priority requests can vary over time according to a number of dynamically recognized factors, such as forecasted numbers of higher and lower priority requests.

In further illustration, FIG. 1 pictorially shows a process for SLA cognizant database connection management for multi-tenant environments. As shown in FIG. 1, different data requests 140 can be issued by different tenants 120 of a multi-tenant computing environment 110. Each of the requests 140 can stem from a corresponding application executing in an application server (not shown) having access to an SLA 130 for the application and, as such, the application server for each of the requests 140 can embed therein priority data for an SLA 130 associated with the application. Thereafter, a connection pool manager 150 can process each of the data requests 140 to determine for each respective one of the tenants 120 whether or not a corresponding one of the tenants 120 is to enjoy lower or higher priority. Thereafter, the connection pool manager 150 can generate a modified data request 190A for the request 140 associated with a tenant 120 having a corresponding SLA 130 meritorious of higher priority, and the connection pool manager 150 can generate a modified data request 190B for the request associated with a tenant 120 having a corresponding SLA 130 meritorious of lower priority.

Modified requests 190A for data are then assigned to existing database connections of a high priority portion 180A of a database connection pool 170 of connections to a database resource 160. Conversely modified requests 190A for data are assigned to existing database connections of a low priority portion 180B of the database connection pool 170 of connections to the database resource 160. Optionally, the size of the high priority portion 180A and the low priority portion 180B can vary depending upon dynamically recognized factors, such as forecasted numbers of higher and lower priority requests emanating from the tenants 120 in the multi-tenant computing environment 110.

The process described in connection with FIG. 1 can be implemented in a multi-tenancy data processing system. In yet further illustration, FIG. 2 is a schematic illustration of a multi-tenancy data processing system configured for SLA cognizant database connection management. The system can include a host computing system 210 that includes one or more computers each with memory and at least one processor. The host computing system 210 can be communicatively coupled to a database 220 which can store data therein enabled for access by way of different data requests 240 by different application instances 230 executing in a multi-tenant environment provided within the host computing system 210.

In this regard, a connection pool 250 of a multiplicity of established database connections to the database 220 can be maintained in the host computing system 210. The connection pool 250, however, can be divided into two or more portions 260, 270. Each of the portions 260, 270 can be assigned to a different priority level, for example a high priority portion 260 and a low priority portion 270. As such, an SLA aware pool management module 300 can be provided to manage both the dynamic apportionment of the database connections in the pool 250 to the different portions 260, 270, and also the assignment of incoming requests 240 to the different portions 260, 270.

The SLA aware pool management module 300 can include program code that when executed in the memory of the host computing system 210 is enabled to assign a priority to each of the requests 240 as the requests are received. The priority assigned to each of the requests 240 can be based upon a corresponding SLA (not shown) for an application instance 230 issuing the request 240. The program code of the SLA aware pool management module 300 also can be enabled to assign the requests 240 to different ones of the portions 260, 270 depending upon the priority assigned to the requests. Finally, the program code of the SLA aware pool management module 300 can be enabled to re-apportion the pool 250 to provide more or less database connections in each of the portions 260, 270 based upon an expected number of high or low priority requests anticipated based upon past observations of request volume at different times and under different computing conditions of the host computing system 210.

In one aspect of the embodiment, the SLA aware pool management module 300 can re-apportion the pool 250 statically at configuration time such that the enlargement of a portion 260, 270 of the pool 250 necessarily results in the contraction of another of the portions 26, 270. In another aspect of the embodiment, however, a buffer of database connections can be established in the pool 250 to the exclusion of the portions 260, 270 and can be used to dynamically augment the number of database connections in any of the pools 260, 270 responsive to an anticipated increase in requests of a particular priority. In particular, the increase in requests of a particular priority can be determined through a notification mechanism by logic disposed between the application instances 230 and the SLA aware pool management module 300, or through an inference mechanism observing past environmental conditions and correlations to request traffic. More particularly, the source of the requests, for instance application components, a router, or a Web server, can detect a pattern of utilization and supply the SLA aware pool management module 300 with anticipatory data useful for determining the re-apportionment of the pool 250.

In even yet further illustration of the operation of the SLA aware pool management module 300, FIG. 3 is a flow chart illustrating a process for SLA cognizant database connection management for multi-tenant environments. Beginning in block 310, a request can be received from a requesting application instance in a multi-tenant computing environment. In block 320, an SLA can be determined for the requestor and a corresponding priority determined for the requestor based upon the SLA. In block 330, the determined priority can be assigned to the request and in block 340 the request can be processed to select a particular portion of a database connection pool through which the request can be satisfied. Finally, in block 350 the selected pool portion can be assigned to the request.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A multi-tenancy data processing system configured for service level agreement (SLA) cognizant database connection management, the system comprising:
   a host computing system comprising at least one computer with memory and at least one processor, the host computing system providing a multi-tenancy computing environment in which different application instances of a computing application execute in the memow of the host computing system;
   a database communicatively coupled to the host computing system;
   a single database connection pool, the single database connection pool including multiple different portions, wherein each of the multiple different portions:
      are defined by partitioning the single database connection pool;
      are assigned a priority level ranging from high to low; and
      include a different subset of multiple different database connections to the database; and
   an SLA aware pool management module executing in the memory of the host computing system, the module comprising program code enabled upon execution to:
      receive different requests for data in the database from different ones of the application instances, the requests issued by tenants of the multi-tenancy computing environment;
      determine a priority for each of the requests;
      select for each of the requests a particular one of the portions of the single database connection pool that has had assigned thereto a priority level that matches the determined priority; and
      process each of the requests through a respectively selected one of the portions of the single database connection pool;
   wherein:
      the portions of the single database connection pool are dynamically re-apportioned to include different ones of the database connections according to an anticipated load of requests of a particular priority based on forecasted numbers of priority requests emanating from the tenants.

2. The system of claim 1, wherein the priority of each of the requests from a corresponding one of the application instances is determined by an SLA associated with the corresponding one of the application instances.

3. The system of claim 1, wherein the priority of each of the requests is embedded therein.

4. The system of claim 1, wherein:
   the connection pool includes a buffer of a multiplicity of database connections not included amongst the portions; and
   wherein the re-apportionment of the portions utilizes database connections within the buffer determining an anticipated increase of requests of a particular priority.

5. A computer program product for service level agreement (SLA) cognizant database connection management for multi-tenant environments, the computer program product comprising a computer readable storage medium having program instructions embodied therewith, the program instructions executable by a device to cause the device to perform a method comprising:
   establishing a single database connection pool in memory of a computer and creating in the single database connection pool, a multiplicity of different database connections to a database;
   partitioning the single database connection pool into different portions, wherein each of the different portions:
      include a subset of the database connections; and
      are assigned a priority level ranging from high to low so that each of the portions of the single database connection pool is assigned a specific priority level that ranges from high to low;

receiving by the device different requests for data in a database from different application instances executing in a memory of a host computing system supporting a multi-tenant computing environment, the requests issued by tenants of the multi-tenancy computing environment;

determining by the device a priority for each of the requests;

selecting by the device for each of the requests a particular one of the portions of the single database connection pool having assigned thereto a priority level that corresponds to the priority of the request; and processing by the device each of the requests through a respectively selected one of the portions of the single database connection pool;

wherein:

portions of the database connection pool are dynamically re-apportioned to include different ones of the database connections according to an anticipated load of requests of a particular priority based on forecasted numbers of priority requests emanating from the tenants.

6. The computer program product of claim 5, wherein the priority of each of the requests from a corresponding one of the application instances is determined by an SLA associated with the corresponding one of the application instances.

7. The computer program product of claim 5, wherein the priority of each of the requests is embedded therein.

8. The computer program product of claim 5, wherein:

the connection pool includes a buffer of a multiplicity of database connections not included amongst the portions; and wherein the re-apportionment of the portions utilizes database connections within the buffer determining an anticipated increase of requests of a particular priority.

* * * * *